United States Patent [19]

Tatemoto et al.

[11] Patent Number: 5,650,472
[45] Date of Patent: Jul. 22, 1997

[54] FLUORINE-CONTAINING COPOLYMER, PROCESS FOR PREPARING THE SAME AND FLUORINE-CONTAINING ELASTOMER

[75] Inventors: Masayoshi Tatemoto; Takayuki Tanaka, both of Osaka, Japan

[73] Assignee: Daikin Industries, Ltd., Osaka, Japan

[21] Appl. No.: 535,046

[22] PCT Filed: Apr. 18, 1994

[86] PCT No.: PCT/JP94/00634

§ 371 Date: Oct. 13, 1995

§ 102(e) Date: Oct. 13, 1995

[87] PCT Pub. No.: WO94/24175

PCT Pub. Date: Oct. 27, 1994

[30] Foreign Application Priority Data

Apr. 16, 1993 [JP] Japan .................. 5-089940

[51] Int. Cl.$^6$ .................................................. C08F 14/18
[52] U.S. Cl. ................................... 526/254; 526/255
[58] Field of Search .............................. 526/254, 255

[56] References Cited

U.S. PATENT DOCUMENTS

| | | | |
|---|---|---|---|
| 3,528,954 | 9/1970 | Carlson | 526/254 |
| 3,817,951 | 6/1974 | Robinson | 526/254 |
| 4,028,431 | 6/1977 | Futami et al. | |
| 4,123,603 | 10/1978 | Stewart, Jr. | 526/254 |
| 4,256,856 | 3/1981 | Ito et al. | 526/254 |
| 4,510,301 | 4/1985 | Levy | 526/254 |
| 4,678,847 | 7/1987 | Zhang et al. | |
| 4,730,029 | 3/1988 | Wachi et al. | 526/254 |
| 5,175,223 | 12/1992 | Brinati et al. | 526/254 |
| 5,264,509 | 11/1993 | Arcella et al. | 526/254 |

FOREIGN PATENT DOCUMENTS

| | | | |
|---|---|---|---|
| 0472908 | 3/1992 | European Pat. Off. | 526/254 |
| 2233288 | 7/1972 | Germany | 526/254 |
| 3610799 | 10/1986 | Germany. | |
| 55-25412 | 2/1980 | Japan | 526/249 |

Primary Examiner—Joseph L. Schofer
Assistant Examiner—N. Sarofim
Attorney, Agent, or Firm—Birch, Stewart, Kolasch & Birch, LLP

[57] ABSTRACT

A novel fluorine-containing copolymer is obtained by radically copolymerizing 60 to 80% by mole of ethylene and 20 to 40% by mole of hexafluoropropylene in the presence of 0.1 to 15% by mole of tetrafluoroethylene as a comonomer, each based on the monomer mixture, under pressure of 10 to 40 kgf/cm$^2$. A fluoroelastomer is obtained by curing the obtained copolymer. The copolymerization is carried out under mild conditions, and the fluoroelastomer obtained by curing the resulting copolymer is excellent in amine resistance.

10 Claims, No Drawings

FLUORINE-CONTAINING COPOLYMER, PROCESS FOR PREPARING THE SAME AND FLUORINE-CONTAINING ELASTOMER

FIELD OF THE INVENTION

The present invention relates to a fluorine-containing copolymer, a process for preparing the same, and a fluorine-containing elastomer. More particularly, the present invention relates to a fluorine-containing copolymer obtained by copolymerizing ethylene, hexafluoropropylene and tetrafluoroethylene, a process for preparing the same, and a fluorine-containing elastomer obtained by curing said fluorine-containing copolymer.

PRIOR ART

An ethylene-hexafluoropropylene copolymer is an elastomeric material, and has mechanical properties which are generally known in relation to fluoroelastomers, and its heat resistance, oil resistance and chemical resistance are close to those of the known properties of the fluoroelastomers. In particular, the ethylene-hexafluoropropylene copolymer is characterized in excellent resistance to methanol and alkali, a excellent electrical insulation, a small dielectric dissipation factor and small frequency dependence.

Since copolymerization reactivities in the copolymerization of ethylene and hexafluoropropylene are very small, it is difficult to copolymerize them under mild conditions. Then, they are copolymerized under very severe conditions such as high pressure of several hundred to several ten thousand $kgf/cm^2$ and a high temperature of 100° C. or higher, or with the irradiation of radiation.

For example, Tatsukami et al reported the copolymerization of the above two monomers under pressure of 650 to 1385 $kgf/cm^2$ at a temperature of 115° to 150° C. in a batch system, or under pressure of 1600 to 2000 $kgf/cm^2$ at a temperature of 160° to 200° C. in a continuous system (J. Chem. Soc., Japan (NIPPON KAGAKUKAI-SHI), 1, 112 (1980)).

Japanese Patent KOKAI Publication No. 83738/1974 discloses preparation of an ethylene/hexafluoropropylene copolymer containing 10 to 50% by mole of hexafluoropropylene under pressure of 40 to 4000 $kgf/cm^2$ at a temperature of 40° to 300° C.

Further, Japanese Patent KOKAI Publication No. 83789/1974 discloses a continuous process for preparing an ethylene/hexafluoropropylene copolymer containing 7.5 to 8.0% by mole of hexafluoropropylene, and describes that pressure of 800 to 4000 $kgf/cm^2$, preferably 1000 to 3000 $kgf/cm^2$ and a temperature of 90° to 300° C., preferably 150° to 250° C. are necessary.

To carry out the copolymerization under such high pressure at such high temperature, or by the radiation polymerization, a special reaction vessel is necessary, and then plant investment increases. Further, such copolymerization processes are not preferred in view of safety. Then, a process of copolymerization which can be carried out under milder conditions has been sought.

SUMMARY OF THE INVENTION

One object of the present invention is to provide a novel fluorine-containing copolymer comprising ethylene and hexafluoropropylene.

Another object of the present invention is to provide a process for preparing a fluorine-containing copolymer comprising copolymerizing ethylene and hexafluoropropylene under mild conditions.

A further object of the present invention is to provide an elastomer which is excellent in amine resistance.

To solve the above problems, the present inventors made various investigations. As the result, it has been found that, when ethylene and hexafluoropropylene are copolymerized, the addition of tetrafluoroethylene as a comonomer makes it possible to copolymerize them under much milder conditions than those used in the conventional copolymerization conditions, that is, under lower pressure at a lower temperature, whereby, a novel copolymer can be obtained, and further it has been found that an elastomer which is obtained by curing the obtained fluorine-containing copolymer is excellent in amine resistance. Then, the present invention has been completed.

A first aspect of the present invention relates to a fluorine-containing copolymer comprising 60 to 80% by mole of ethylene, 20 to 40% by mole of hexafluoropropylene and 0.1 to 15% by mole of tetrafluoroethylene.

A second aspect of the present invention relates to a process for preparing a fluorine-containing copolymer comprising radically copolymerizing 60 to 80% by mole of ethylene and 20 to 40% by mole of hexafluoropropylene in the presence of 0.1 to 15% by mole of tetrafluoroethylene as a comonomer, each based on the monomer mixture, under pressure of 10 to 40 $kgf/cm^2$.

A third aspect of the present invention relates to a fluoroelastomer obtained by curing the copolymer prepared by the above process.

The present invention will be explained more in detail.

DETAILED DESCRIPTION OF THE INVENTION

The copolymer of the present invention is obtained by copolymerizing 60 to 80% by mole of ethylene and 20 to 40% by mole of hexafluoropropylene in the presence of 0.1 to 15% by mole of tetrafluoroethylene as a comonomer, each based on the monomer mixture. By the addition of tetrafluoroethylene in an amount in this range, not only the copolymerization is accelerated, but also properties such as amine resistance of the fluoroelastomer which is obtained from the resulting copolymer are improved.

In the process of the present invention, the polymerization is carried out in a manner of radical polymerization using a radical polymerization initiator. As the radical polymerization initiator, any of conventional ones may be used.

As a polymerization process, any of known polymerization processes such as solution polymerization, suspension polymerization and emulsion polymerization may be employed.

In solution polymerization, a solvent in which the above monomers are dissolved such as R-113 (1,1,2-trichloro-1,2,2-trifluoroethane), R-114 (1,2-dichloro-1,1,2,2-tetrafluoroethane), perfluorohexane, C-318 (perfluorocyclobutane), $CF_2ClCFClCF_2CF_3$, $CF_3CFClCFClCF_3$, perfluorobenzene, $C_4F_6Cl_4$, and so on is used to proceed the polymerization. In suspension and emulsion polymerization, the monomers are suspended or emulsified in water and polymerized. In suspension and emulsion polymerization, the reaction can be accelerated by the addition of a solvent which is insoluble in water but in which the monomers are dissolved.

In industrial production, the emulsion polymerization is preferred. In this case, a water-soluble radical polymerization initiator is used. Preferred examples of the radical polymerization initiator are potassium persulfate, ammonium persulfate, potassium persulfate-sodium hydrogen carbonate, potassium persulfate-iron sulfate, ammonium persulfate-iron sulfate, potassium persulfate-sodium sulfite, ammonium persulfate-sodium sulfite, potassium persulfate-sodium hydrogen sulfite, ammonium persulfate-sodium hydrogen sulfite, and so on. In particular, ammonium persulfate is preferred.

The initiator is used in an amount of 0.1 to 4.0 g per one liter of water. This amount of the initiator is relatively large in comparison with the amount of the initiator used in the conventional emulsion polymerization which is usually in the order of milligram (mg) per one liter of water.

Examples of the emulsifier are $F(CF_2)_nCO_2NH_4$ in which n is from 7 to 10, a compound of the formula: $C_3F_7O$—$[CF(CF_3)$—$CF_2O]_n$—$CF(CF_3)$—$CO_2NH_4$ in which n is from 1 to 3, and so on. In particular, ammonium perfluorooctanoate is preferred.

The emulsifier is used in an amount of 1 to 10 wt. % based on the weight of pure water. This amount of the emulsifier is relatively large, since the amount of the emulsifier is from 0.1 to 1 wt. % in the conventional emulsion polymerization. This is one of the characteristics of the present invention. This is based on the finding that, when a concentration of the emulsifier is higher than a critical micelle concentration, the number of particles in the resulting emulsion is adjusted to at least $10^{14}$, preferably at least $10^{15}$ per one ml of the emulsion, whereby the polymerization reaction rate and a molecular weight of the obtained polymer are increased.

In the emulsion polymerization of the present invention, a fluorine-containing solvent having no radical activity such as R-113, R-114, C-318, S-316 ($C_4F_6Cl_4$), $CF_2ClCFClCF_2CF_3$, $CF_3CFClCFClCF_3$, and so on may be added to the reaction system. Herein, "no radical activity" means that the solvent does not function as a polymerization retarder or inhibitor. An added amount can be 5 to 20 vol. % based on the volume of pure water as long as the emulsified state is maintained. Surprisingly, it has been found that the addition of R-113 increases the polymerization rate. Those solvents may function as an emulsifying accelerator.

A polymerization temperature is from 40° to 100° C., and polymerization pressure is from 10 to 40 kgf/cm². The polymerization according to the present invention can be carried out at a lower temperature under lower pressure than those employed in the conventional copolymerization of ethylene and hexafluoropropylene which is carried out at a temperature of 100° C. or higher under pressure of several hundred atm. or higher.

In the process of the present invention, while it may be possible to add all the monomers at the same time to a polymerization reactor such as an autoclave containing the solvent, hexafluoropropylene which has a relatively high boiling point among the monomers is first added, and then ethylene and tetrafluoroethylene which have lower boiling points are gradually added in portions to supplement consumed amounts of the latter two monomers, in a preferred embodiment.

Now, a method for producing the fluoroelastomer by curing the fluorine-containing copolymer which is prepared in the above explained process will be explained.

As a curing agent, a known curing agent such as a peroxide compound, a polyamine compound and a polyhydroxy compound may be used. Preferably, the peroxide compound is used. Examples of the peroxide compound are 4-butyl peroxybenzoate, 1,1-bis(tert.-butylperoxy)-3,5,5-trimethylcyclohexane, 2,5-dimethylhexane-2,5-dihydroxy peroxide, di-tert.-butyl peroxide, tert.-butylcumyl peroxide, dicumyl peroxide, α,α'-bis(tert.-butylperoxy)-p-diisopropylbenzene, 2,5-dimethyl-2,5-di(tert.-butylperoxy) hexane, 2,5-dimethyl-2,5-di(tert.-butylperoxy)hexyne-3, benzoyl peroxide, tert.-butyl peroxybenzene, 2,5-dimethyl-2,5-di(benzoylperoxy)hexane, tert.-butyl peroxymaleate, tert.-butyl peroxyisopropylcarbonate, and so on.

An amount of the curing agent is from 0.1 to 10 part by weight, preferably from 0.5 to 5 parts by weight per 100 parts by weight of a composition.

When the organic peroxide compound is used, the use of a curing aid or co-curing agent in combination with the curing agent will have considerable effects. Any curing agent or co-curing agent can be used in principle, as long as it has a reactivity with a peroxy radical and a polymer radical. Preferred examples are triallyl cyanurate, triallyl isocyanurate, triacrylformal, triallyl trimellitate, N,N'-m-phenylene bismaleimide, dipropargyl terephthalate, diallyl terephthalate, tetraallyl terephthalamide, and so on.

An amount of the curing aid or co-curing agent is from 0.1 to 10 parts by weight, preferably from 0.5 to 5 parts by weight per 100 parts by weight of the composition.

To the fluorine-containing copolymer of the present invention, a conventional additive to a rubber such as a reinforcing material, a filler, a plasticizer, a mold releasing agent, a softening agent, a stabilizer, an extender, etc. may be added.

To mix those components, a conventional open roll can be used.

The fluorine-containing copolymer composition according to the present invention may be cured under curing conditions for the conventional fluororubber. For example, after roll kneading, the fluororubber composition is charged in a mold and press cured by maintaining the composition under pressure of 20 to 100 kg/cm² at a temperature of 100° to 200° C. for 5 to 180 minutes, and then oven cured by maintaining it in a furnace kept at 150° to 300° C. for 0 to 40 hours to obtain the cured rubber.

Since the fluoroelastomer of the present invention is excellent in amine resistance, it can be used as an oil seal for an automobile, a valve stem seal, a bearing seal, and the like, or various sealing materials of chemical plants which require amine resistance.

EXAMPLES

The copolymer of the present invention and its cured material will be explained by the following examples, which will not limit the scope of the present invention.

Example 1

In a 3 liter SUS autoclave, water (1.5 liters) and $C_7F_{15}COONH_4$ (75 g) were charged. After closing a lid, the autoclave was evacuated. After evacuation, hexafluoropropylene (HFP) (500 g) was added in a liquid state. Then, a temperature of the system was adjusted to 50° C. After reaching 50° C., a monomer mixture of ethylene (E) and tetrafluoroethylene (TFE) in a molar ratio of 98:2 was charged till the pressure went up to 35 kgf/cm².

When an internal pressure of the autoclave was stabilized between 34.5 and 35.0 kgf/cm², a polymerization initiator, ammonium persulfate (APS) (3 g) dissolved in pure water was injected. As the polymerization was initiated, the monomers were consumed and then the pressure dropped. When the pressure dropped, additional monomer mixture of E and TFE was charged from time to time to maintain the pressure from 34.5 to 35.0 kgf/cm². When the consumed amount of the EFFFE monomer mixture exceeded about 100 g, the addition of the monomer mixture was stopped, and also agitation and heating were stopped. Then, the gas in the autoclave was removed, and the lid was opened.

A transparent dispersion was recovered from the autoclave. A solid content in the dispersion was 16.6 wt. %. The dispersion was freeze-coagulated. The coagulated polymer is thoroughly washed with water to remove the deposited emulsifier. The washed polymer was dried under reduced pressure at 100° C. to remove water and the residual emulsifier.

After drying, an opaque white polymer was obtained. A yield was 338 g.

A glass transition temperature (Tg) (measured by DSC), a decomposition temperature (Td) (measured by DTGA), a Mooney viscosity at 140° C., and a specific gravity at 25° C. of the obtained polymer were measured (Table 1). A polymer composition was determined from elementary analysis and $^{19}F$-NMR of the polymer. This polymer had a composition was ethylene (E)/hexafluoropropylene (HFP)/tetrafluoroethylene (TFE) of 66/33/1 (mole %).

Examples 2–5 and Comparative Example 1

In the same manner as in Example 1 except that a molar ratio of ethylene (E) to tetrafluoroethylene (TFE) in the monomer mixture was changed to 95:5 (Example 2), 90:10 (Example 3), 80:20 (Example 4), 70:30 (Example 5) or 100:0 (Comparative Example 1), polymerization was carried out, followed by post treatment, to obtain a polymer.

Yields, Tg, Td, the Mooney viscosities, specific gravities and compositions of the obtained polymers were measured in the same ways as in Example 1. The results are shown in Table 1 together with those of the polymer obtained in Example 1.

The number of particles per one ml of the resulting emulsion was calculated from an average particle size in the emulsion which was measured by a dynamic light scattering method at room temperature using a laser particle size analyzer system LPA-3000/3100 (manufactured by Otsuka Denshi Corporation).

The emulsion was treated in the same way as in Example 1 to obtain a polymer.

Yields, compositions, Tg, Td, the Mooney viscosities and surface tensions (at room temperature) of the obtained polymers were measured in the same ways as in Example 1. The results are shown in Table 1.

TABLE 1

| Ex. No. | Charged monomer E/TFE (mole/mole) | APS[1] (g) | Polymerization rate[2] (cycles/hr) | Polymerization pressure (kgf/cm²) | Solid content (wt. %) | Yield (g) | Polymer composition E/HFP/TFE | Tg (°C.) | Td (°C.) | Mooney viscosity $Mu_{L1+10}$ (140° C.) | Specific gravity (g/cm³) |
|---|---|---|---|---|---|---|---|---|---|---|---|
| Ex. 1 | 98/2 | 6.0 | 5.6 | 36 | 16.6 | 338 | 66/33/1 | −5 | 282 | 59 | 1.57 |
| Ex. 2 | 95/5 | 2.5 | 4.8 | 36 | 13.6 | 257 | 66/30/4 | −2 | 333 | 93 | 1.55 |
| Ex. 3 | 90/10 | 2.5 | 5.3 | 36 | 15.3 | 308 | 64/30/7 | 2 | 338 | 120 | 1.56 |
| Ex. 4 | 80/20 | 2.5 | 8.3 | 31 | 15.4 | 268 | 61/27/11 | 11 | 349 | 140 | 1.59 |
| Ex. 5 | 70/30 | 2.5 | 9.1 | 31 | 16.5 | 323 | — | 26 | 346 | 95 | 1.67 |
| C. Ex. 1 | 100/0 | 5.0 | 3.8 | 36 | 16.6 | 335 | 66/34/0 | −10 | 316 | 43 | 1.55 |

Notes:
1) A total amount of APS added during polymerization.
2) The number of additions of the E/TFE monomer mixture per one hour.

Examples 6–11 and Comparative Example 2

In the same manner as in Example 2 except that an amount of the emulsifier, $C_7F_{15}COONH_4$ was changed, and a polymerization temperature was changed to 65° C., polymerization was carried out. When a concentration of an emulsifier is low in polymerization, a yield of a polymer is low even if a large amount of a polymerization initiator is used.

TABLE 2

| Ex. No. | $C_7F_{15}$—COONH$_4$ (wt. %) | APS[1] (g) | Time (hrs) | Yield (g) | No. of particles (ml$^{-1}$) | Polymer composition E/HFP/TFE | Tg (°C.) | Td (°C.) | Mooney viscosity $Mu_{L1+10}$ (140° C.) | Surface tension (dyne/cm) |
|---|---|---|---|---|---|---|---|---|---|---|
| C. Ex. 2[2] | 0.1 | 20.25 | 61.3 | 190 | $2.5 \times 10^{13}$ | — | −12 | 237 | Not measured | 32 |
| Ex. 6 | 1.0 | 11.25 | 40.3 | 369 | $6.5 \times 10^{13}$ | 66/32/2 | −7 | 274 | 35 | 46 |
| Ex. 7 | 1.5 | 6.25 | 24.4 | 382 | — | 66/32/2 | −7 | 278 | 28 | 52 |
| Ex. 8 | 2.0 | 9.00 | 27.4 | 391 | $2.2 \times 10^{17}$ | 65/33/2 | −6 | 275 | 67 | 52 |
| Ex. 9 | 3.0 | 6.75 | 21.0 | 381 | $1.2 \times 10^{18}$ | 64/32/4 | −6 | 285 | 63 | 46 |
| Ex. 10 | 5.0 | 6.75 | 14.6 | 318 | $7.7 \times 10^{17}$ | 63/32/5 | −6 | 272 | 64 | 42 |
| Ex. 11 | 7.0 | 4.50 | 11.3 | 316 | $6.8 \times 10^{17}$ | 63/33/4 | −5 | 303 | 51[3] | 39 |

Notes:
1) A total amount of APS added every 10 hours (4.5 g each).
2) The additional monomer mixtures were added 50 times.
3) $M_{L1+10}$ (140° C.).

Example 12

In a 3 liter SUS autoclave, water (1.5 liters), R-113 (50 ml) and $C_7F_{15}COONH_4$ (150 g) were charged. After closing a lid, the autoclave was evacuated. After evacuation, hexafluoropropylene (HFP) (500 g) was added in a liquid state. Then, a temperature of the system was adjusted to 65° C. After reaching 65° C., a monomer mixture of ethylene (E) and tetrafluoroethylene (TFE) in a molar ratio of 95:5 was charged till the pressure went up to 40 kgf/cm$^2$.

When an internal pressure of the autoclave was stabilized between 39.5 and 40.0 kgf/cm$^2$, a polymerization initiator, ammonium persulfate (APS) (4.5 g) dissolved in pure water was injected. As the polymerization was initiated, the monomers were consumed and then the pressure dropped. If the polymerization was not initiated, additional APS was added. When the pressure dropped, additional monomer mixture of E and TFE was charged from time to time to maintain the pressure from 39.5 to 40.0 kgf/cm$^2$. When the consumed amount of the EFFFE monomer mixture exceeded about 100 g, the addition of the monomer mixture was stopped, and also agitation and heating were stopped. Then, the gas in the autoclave was removed, and the lid was opened.

A transparent dispersion was recovered from the autoclave. A solid content in the dispersion was 17.2 wt. %. The dispersion was freeze-coagulated. The coagulated polymer is thoroughly washed with water to remove the deposited emulsifier. The washed polymer was dried under reduced pressure at 100° C. to remove water and the residual emulsifier.

After drying, an opaque white polymer was obtained. A yield was 372 g.

A composition, Tg, Td and a molecular weight (by GPC) of the obtained polymer were measured in the same ways as in Example 1. The results are shown in Table 3.

Example 13

In the same manner as in Example 12 except that perfluorohexane (C$_6$F$_{14}$) was used in place of R-113, polymerization was carried out, followed by post treatment, to obtain a polymer.

A yield, a composition, Tg, Td, and a molecular weight of the obtained polymer were measured in the same ways as in Example 1. The results are shown in Table 3.

Example 14

In the same manner as in Example 12 except that no R-113 was used, polymerization was carried out, followed by post treatment, to obtain a polymer.

A yield, a composition, Tg, Td and a molecular weight of the obtained polymer were measured in the same ways as in Example 1. The results are shown in Table 3.

Example 15

Each of the fluorine-containing polymers obtained in Examples 1–6 was cured and molded as follows:

First, a compound having the following composition was prepared:

| | |
|---|---|
| Fluorine-containing polymer | 100 wt. parts |
| MT carbon | 20 |
| Highly active magnesium oxide | 15 wt. parts |
| Triallyl isocyanurate | 2.5 wt. parts |
| tert.-Butyl peroxybenzoate | 3.7 wt parts |

The compound was kneaded on an open roll at room temperature. The compound was well adhered to the roll and very easily kneaded. The kneaded compound was charged in a mold, and maintained under 71 kgf/cm$^2$G at 160° C. for 20 minutes to press cure it, and then maintained in an oven at 200° C. for 24 hours to oven cure it.

Then, with the elastomer obtained by curing, 100% tensile stress (M$_{100}$), tensile strength at break (T$_B$), elongation at break (E$_B$) and hardness (Hs) were measured at 25° C. according to JIS K 6301.

According to JIS K 6301, the elastomer was subjected to a Gehman cold torsion test. T$_{10}$ was −5.5° C.

After dipping the elastomer sample in a motor oil containing amines as additives (NISSAN Genuine Motor Oil Extra Save X 7.5W-30 SG Grade) at 175° C. for 72 hours, T$_B$, E$_B$ and Hs were measured. Then, from the values before and after dipping, a residual rate of each property was calculated according to the following formula:

T$_B$ Residual rate (%)=(T$_{B2}$/T$_{B1}$)×100 where T$_{B1}$ and T$_{B1}$ are measured values of T$_B$ before and after dipping, respectively.

E$_B$ Residual rate (%)=(E$_{B2}$/E$_{B1}$)×100 where E$_{B1}$ and E$_{B2}$ are measured values of E$_B$ before and after dipping, respectively.

Hs Residual value=Hs$_2$−Hs$_1$ where Hs$_1$ and Hs$_2$ are Hs values before and after dipping.

In addition, a volume change rate was calculated from the volumes of the elastomer sample before and after dipping.

The same measurements were done with Commercial Product A (a vinylidene fluoride/hexafluoropropylene copolymer, DAIEL G801 manufactured by Daikin Indus-

TABLE 3

Effects of Solvent Addition in Emulsion Polymerization

| Ex. No. | Solvent | Monomer mixture E/TFE (mole %) | APS (g) | Time[1] (hrs) | Solid content (wt. %) | Yield (g) | Polymer composition E/HFP/TFE (mole %) | Mn × 10$^{-4}$ (GPC) | Mw/Mn (GPC) | Tg (°C.) | Tg (°C.) |
|---|---|---|---|---|---|---|---|---|---|---|---|
| Ex. 12 | R-113 | 95/5 | 4.5 | 7.2 | 17.2 | 327 | 64.0/29.5/6.5 | 1.7 | 11 | −7 | 294 |
| Ex. 13 | C$_6$F$_{14}$ | 95/5 | 4.5 | 10.1 | 17.6 | 358 | 62.5/32.3/5.2 | — | — | −6 | 279 |
| Ex. 14 | — | 95/5 | 4.5 | 14.5 | 14.5 | 429 | 63.2/30.4/6.4 | 0.7 | 7 | −5 | 288 |

Notes: 1) A time required from the start to the end of polymerization.

tries Ltd.), Commercial Product B (a vinylidene fluoride/hexafluoropropylene/tetrafluoroethylene copolymer, DAIEL G901 manufactured by Daikin Industries Ltd.), Commercial Product C (a vinylidene fluoride/hexafluoropropylene/tetrafluoroethylene copolymer, DAIEL G902 manufactured by Daikin Industries Ltd.) and Commercial Product D (a vinylidene fluoride/tetrafluoroethylene/propylene copolymer).

The results are shown in Tables 4 and 5.

TABLE 4

| Elastomer | Density (g/cm³) | $M_{100}$ (kgf/cm²) | $T_B$ (kgf/cm²) | $E_B$ (%) | Hs |
|---|---|---|---|---|---|
| Ex. 1 | 1.64 | 67 | 160 | 199 | 70 |
| Ex. 2 | 1.65 | 75 | 187 | 205 | 73 |
| Ex. 3 | 1.66 | 81 | 223 | 224 | 71 |
| Ex. 4 | 1.68 | 153 | 303 | 184 | 80 |
| C. Ex. 1 | 1.64 | 51 | 147 | 200 | 68 |
| Com. P.[1] A | 1.80 | 19 | 223 | 466 | 62 |
| Com. P. B | 1.87 | 32 | 237 | 358 | 67 |
| Com. P. C | 1.87 | 34 | 219 | 314 | 66 |
| Com. P. D | 1.64 | 40 | 179 | 258 | 68 |

Note: 1) Commercial Product.

TABLE 5

| | Resistance to motor oil containing amines | | | |
|---|---|---|---|---|
| Elastomer | Volume change rate (%) | $T_B$ residual rate (%) | $E_B$ residual rate (%) | Hs residual value |
| Ex. 1 | 6.05 | 92.5 | 81.9 | −5 |
| Ex. 2 | 6.77 | 92.7 | 90.5 | −9 |
| Ex. 3 | 5.78 | 99.7 | 93.3 | −3 |
| Ex. 4 | 4.38 | 96.1 | 125.1 | −4 |
| C. Ex. 1 | 6.98 | 68.3 | 90.8 | −6 |
| Com. P. A | 1.25 | 22.6 | 154.1 | 3 |
| Com. P. B | 1.13 | 32.9 | 142.7 | 2 |
| Com. P. C | 0.97 | 36.4 | 39.6 | 4 |
| Com. P. D | 1.92 | 27.6 | 40.6 | −1 |

The above elastomers according to the present invention were dipped in ethylenediamine at room temperature for one hour, but no surface change was observed. In contrast, DAIEL G902 was cracked.

As explained above, according to the present invention, ethylene and hexafluoropropylene are easily copolymerized to give a novel fluorine-containing copolymer. An elastomer obtained by curing the obtained copolymer is excellent in amine resistance.

What is claimed is:

1. A fluorine-containing copolymer comprising 60 to 80% by mole of ethylene, 20 to 40% by mole of hexafluoropropylene and 0.1 to 15% by mole of tetrafluoroethylene.

2. A process for preparing a fluorine-containing copolymer comprising radically copolymerizing 60 to 80% by mole of ethylene and 20 to 40% by mole of hexafluoropropylene in the presence of 0.1 to 15% by mole of tetrafluoroethylene as a comonomer, each based on the monomer mixture, under pressure of 10 to 40 kgf/cm².

3. The process according to claim 2, wherein the copolymerization is carried out by emulsion polymerization.

4. The process according to claim 3, wherein the emulsion polymerization is carried out using a perfluorinated carboxylic acid emulsifier as an emulsifier.

5. The process according to claim 4, wherein the emulsifier is used in a concentration higher than a critical micelle concentration, and the number of particles in the resulting emulsion is at least $10^{14}$ per one ml of the emulsion.

6. The process according to claim 3, wherein a fluorine-containing solvent having no radical activity is used as an agent for accelerating and stabilizing emulsification.

7. The process according to claim 5, wherein said fluorine-containing solvent is 1,1,2-trichloro-1,2,2-trifluoroethane.

8. A fluoroelastomer obtained by curing the copolymer claimed in claim 1.

9. A fluoroelastomer obtained by curing the copolymer prepared by the process claimed in claim 2.

10. The fluoroelastomer according to claims 8 or 9, wherein the curing is carried out by a peroxide and a triallyl isocyanurate compound.

* * * * *